United States Patent
Fujimoto et al.

(10) Patent No.: US 8,724,167 B2
(45) Date of Patent: May 13, 2014

(54) IMAGE PROCESSING APPARATUS AND IMAGE PROCESSING METHOD TO REDUCE RECORDING MATERIAL AMOUNT

(75) Inventors: Yasunori Fujimoto, Inagi (JP); Ryuta Hirayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 12/951,985

(22) Filed: Nov. 22, 2010

(65) Prior Publication Data
US 2011/0128560 A1    Jun. 2, 2011

(30) Foreign Application Priority Data
Nov. 30, 2009 (JP) ................................. 2009-272575

(51) Int. Cl.
*G06F 15/00* (2006.01)

(52) U.S. Cl.
USPC .......................................................... 358/1.9

(58) Field of Classification Search
USPC ........................................ 358/1.9, 3.06, 3.27
See application file for complete search history.

(56) References Cited

U.S. PATENT DOCUMENTS

| | | | |
|---|---|---|---|
| 6,164,756 A * | 12/2000 | Takahashi et al. | 347/43 |
| 6,445,463 B1 * | 9/2002 | Klassen | 358/1.9 |
| 7,396,098 B2 | 7/2008 | Kanematsu | |
| 2003/0058474 A1 * | 3/2003 | Loce et al. | 358/2.1 |
| 2003/0095287 A1 * | 5/2003 | Miyagi et al. | 358/2.1 |
| 2007/0153046 A1 | 7/2007 | Kanematsu | |
| 2007/0247649 A1 * | 10/2007 | Kanematsu et al. | 358/1.9 |

FOREIGN PATENT DOCUMENTS

JP    2007-176158 A    7/2007

* cited by examiner

*Primary Examiner* — Jeremiah Bryar
(74) *Attorney, Agent, or Firm* — Canon USA, Inc., IP Division

(57) ABSTRACT

An image processing apparatus includes an acquisition unit, a determination unit, and a thinning unit. The acquisition unit may acquire color information concerning color of an image having an attribute of at least one of character or line drawing. The determination unit may determine a thinning ratio for thinning data of non-edge portions of the image according to the color information acquired by the acquisition unit. The thinning unit may thin data of the non-edge portions according to the thinning ratio determined by the determination unit. The thinning ratio determined by the determination unit when the color information indicates a color other than black is lower than the thinning ratio determined when the color information indicates black.

16 Claims, 15 Drawing Sheets

PIXEL OF INTEREST

PIXEL OF INTEREST

FIG.7G
4001 ⌇◼
FIG.7H
4002 ⌇◼
FIG.7I
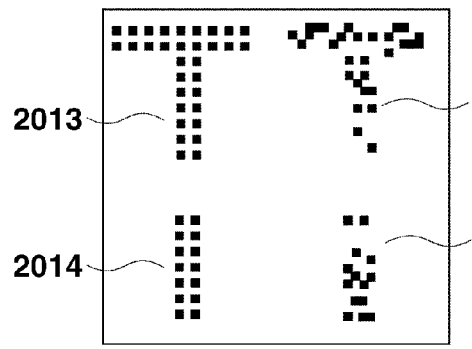
FIG.7J
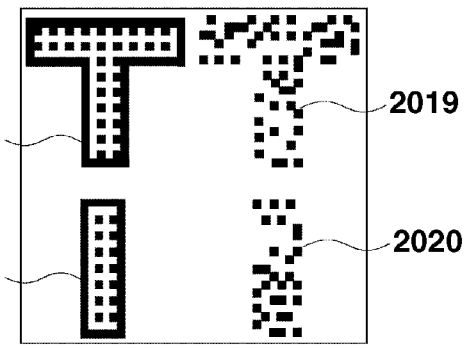

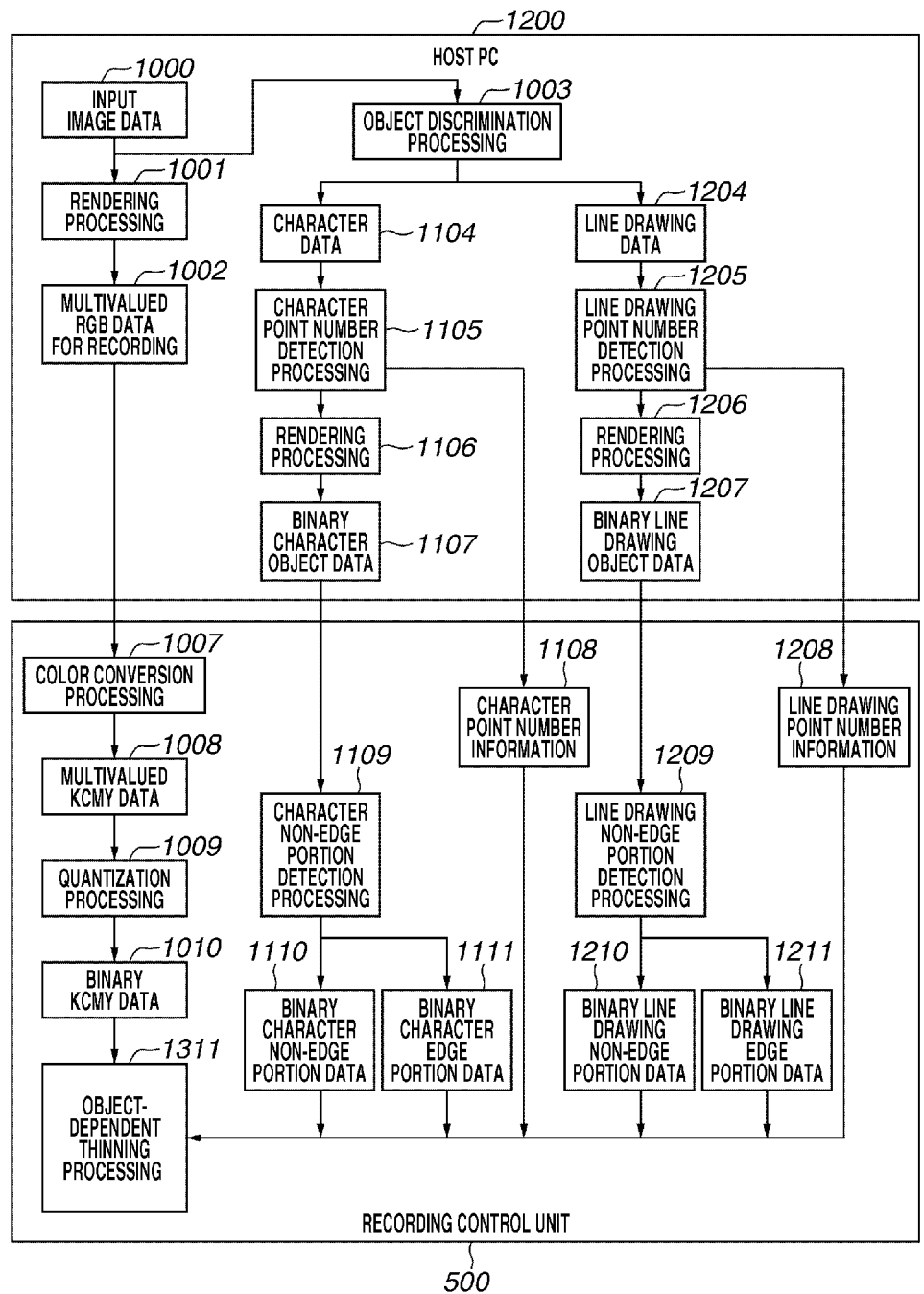

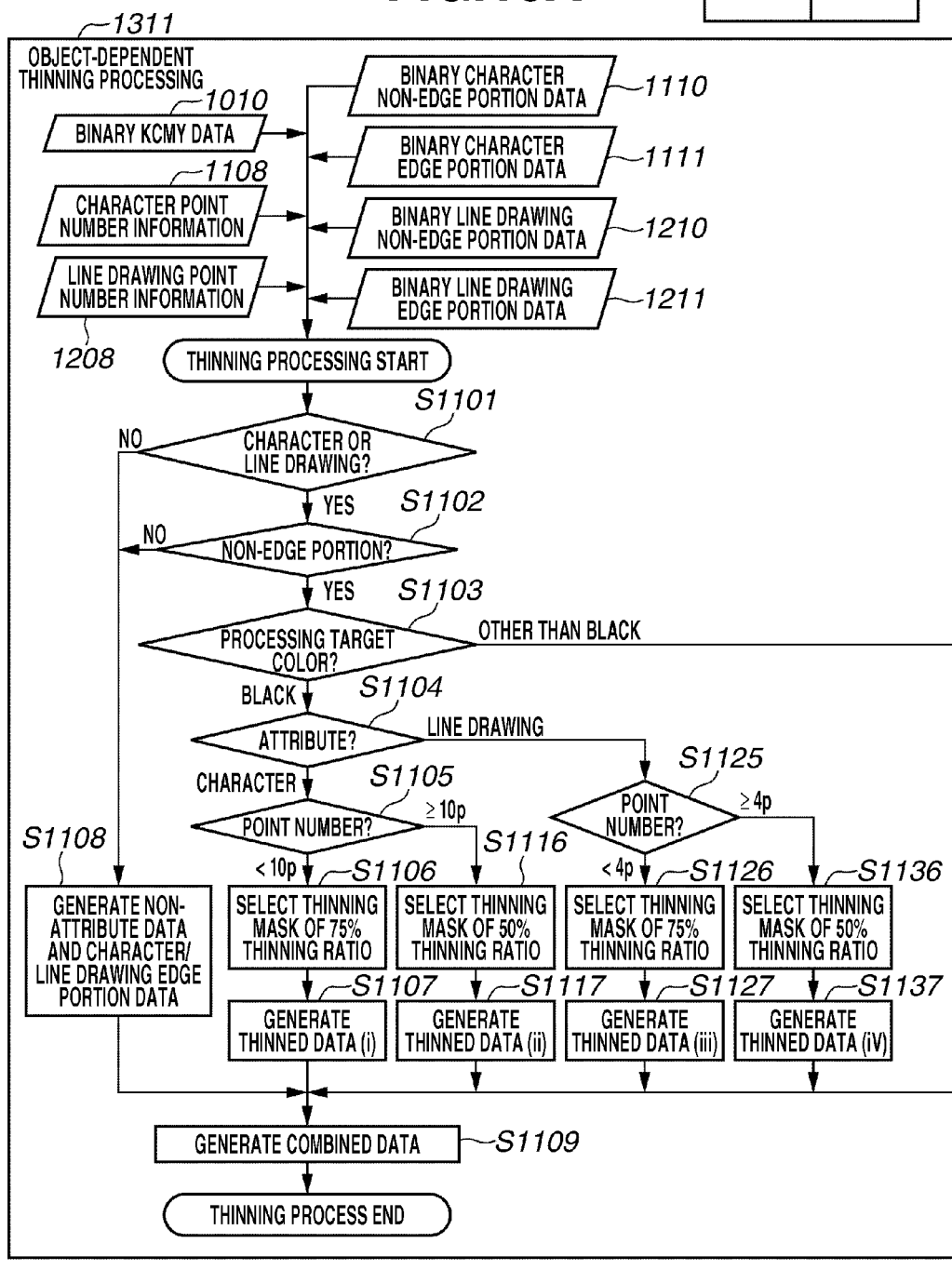

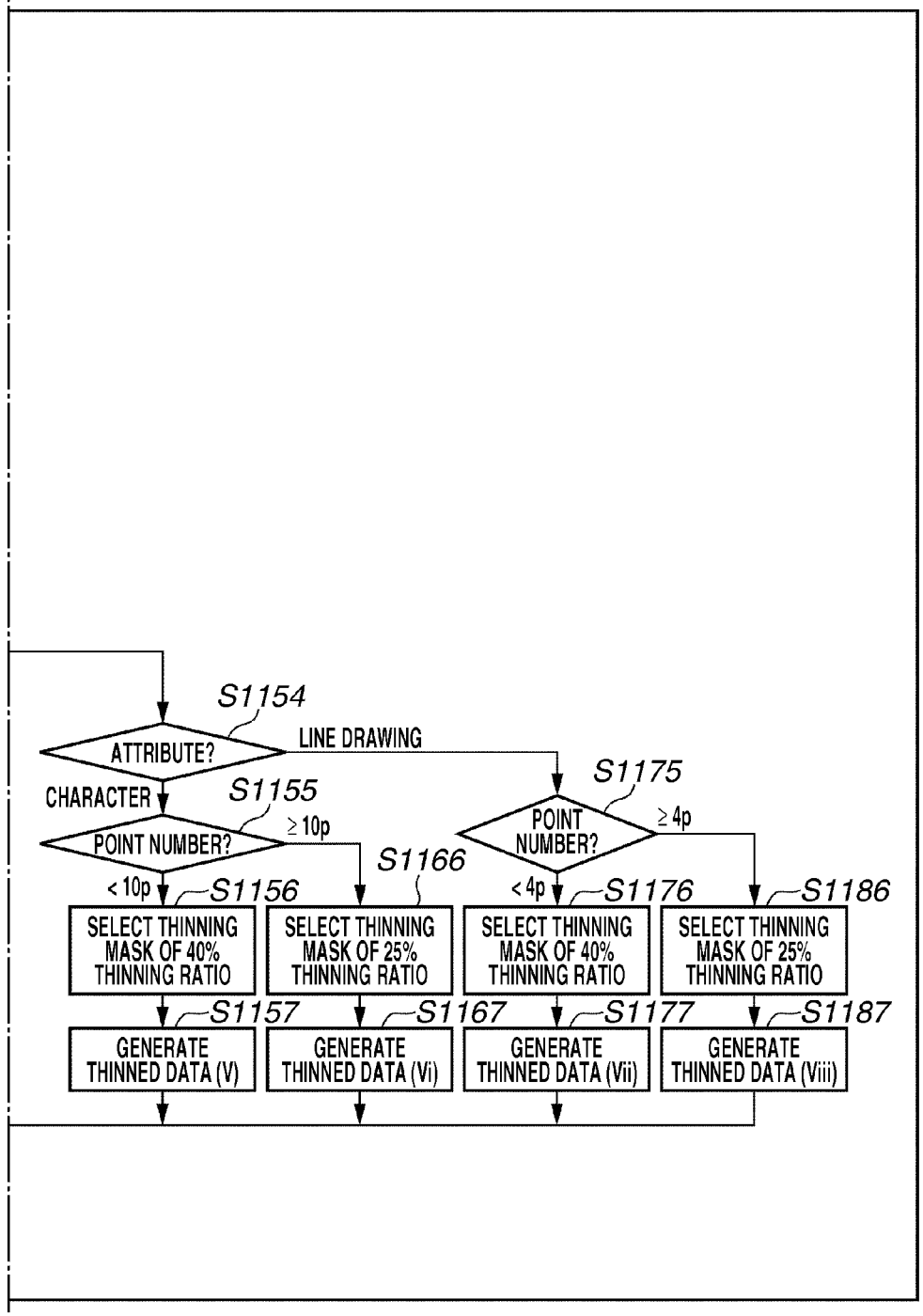

INPUT IMAGE DATA

RGB DATA FOR RECORDING

BINARY CHARACTER OBJECT DATA

MULTIVALUED K DATA

BINARY CHARACTER NON-EDGE PORTION DATA

BINARY K DATA

BINARY CHARACTER EDGE PORTION DATA

BINARY LINE
DRAWING OBJECT DATA

BINARY LINE DRAWING
NON-EDGE PORTION DATA

BINARY LINE DRAWING
EDGE PORTION DATA

IMAGE PROCESSING APPARATUS AND IMAGE PROCESSING METHOD TO REDUCE RECORDING MATERIAL AMOUNT

BACKGROUND OF THE INVENTION

1. Field of the Invention

The present invention relates to an image processing apparatus and an image processing method capable of executing reduction processing for reducing an amount of recording material used for formation of non-edge portions of an image.

2. Description of the Related Art

Japanese Patent Application Laid-Open No. 2007-176158 discusses a method for reducing usage amount of recording material (number of recording dots), while keeping image quality, in order to achieve a good balance between high image quality and low running cost. The technique discussed in Japanese Patent Application Laid-Open No. 2007-176158 reduces usage amount of recording material (number of recording dots) by thinning data of non-edge portions of images according to a predetermined thinning ratio, while maintaining image quality, and thus realizes cut-down of running cost.

However, in the technique discussed in Japanese Patent Application Laid-Open No. 2007-176158, the thinning ratio of the non-edge portions is constant without depending on colors (e.g., difference between black character/color character) of the images. For this reason, a difference in color density in the non-edge portions becomes noticeable, between when the images are made up of color and when made up of black, and thus image quality may be degraded in some cases.

Further, Japanese Patent Application Laid-Open No. 2007-176158 is described on the precondition that binary data is input, as a detection processing of the edge portions and the non-edge portions. If black 100% or the like is input, it is often the case that binary data also becomes a 100% duty image. On the other hand, if grey or color image or the like is input, it is more often the case that it becomes an image of non-100% duty. In the binary data in which an image of non-100% duty has been binarized, it is more often the case that pixels which do not record dots exist also inside characters. Therefore, if detection processing of the edge portions and the non-edge portions is performed using the binary data of non-100% duty as input, edges will eventually exist also inside the characters.

Further, edge processing performed using multivalued data as input is also known. In this case, although edges do not exist inside the characters, processing load thereof becomes larger than that of detection processing of binary edge portions and non-edge portions. If the edge processing is realized by hardware, there is a possibility that circuit scale will eventually become larger, and thus product cost will eventually become high. There is a possibility that a personal computer (PC) requires a high-spec performance, if the edge processing is realized as a program (on software basis) on a recording apparatus or the like, or processing time will eventually become long.

SUMMARY OF THE INVENTION

The present invention is directed to an image processing apparatus and an image processing method capable of obtaining an image with a high quality without depending on color of the image, while reducing an amount of recording material used for formation of non-edge portions of the image.

According to an aspect of the present invention, an image processing apparatus includes an acquisition unit, a determination unit, and a thinning unit. The acquisition unit may acquire color information concerning color of an image having an attribute of at least one of character or line drawing. The determination unit may determine a thinning ratio for thinning data of non-edge portions of the image according to the color information acquired by the acquisition unit. The thinning unit may thin data of the non-edge portions according to the thinning ratio determined by the determination unit. In an example, the thinning ratio determined by the determination unit when the color information indicates a color other than black is lower than the thinning ratio determined when the color information indicates black.

According to exemplary embodiments of the present invention, also in an image of non-100% duty, it becomes possible to obtain a high quality image without depending on color of the image while reducing an amount of recording material used for formation of non-edge portions of the image. Further, since edge processing is not targeted for multivalued data, it becomes possible to realize the high quality image at a low cost or in a short time.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A to 7J are conceptual views of thinning processing of non-edge portion data according to the first exemplary embodiment.

FIG. 9 is a block diagram illustrating a schematic configuration for performing image data processing in an image processing system according to a third exemplary embodiment.

FIG. 10, composed of FIGS. 10A and 10B, is a flowchart illustrating a sequence of object-dependent thinning processing of FIG. 9.

DESCRIPTION OF THE EMBODIMENTS

Various exemplary embodiments, features, and aspects of the invention will be described in detail below with reference to the drawings.

Figure 1:
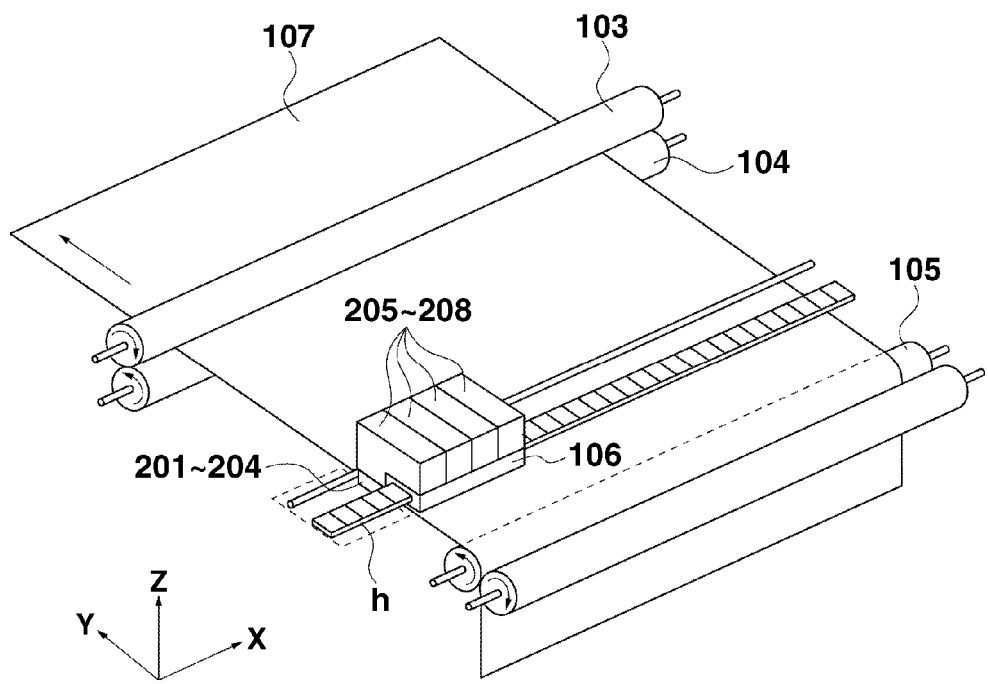
FIG. 1 is a perspective view illustrating a schematic configuration of an inkjet recording apparatus.

FIG. 1 is a schematic perspective view illustrating a configuration of a color inkjet recording apparatus according to an exemplary embodiment. Ink tanks 205 to 208 accommodate four color inks (black, cyan, magenta, yellow: K, C, M, Y), respectively, and can supply these four color inks to recording heads 201 to 204. The recording heads 201 to 204 are provided corresponding to four color inks and can discharge the inks supplied from the ink tanks 205 to 208.

A conveying roller 103 conveys a recording medium (recording sheet) 107 by clamping the recording medium 107 in cooperation with an auxiliary roller 104 as it rotates. The conveying roller 103 also serves to hold the recording medium 107. A carriage 106 can mount the ink tanks 205 to 208 and the recording heads 201 to 204 and reciprocally move in an X direction carrying these recording heads and ink tanks. As the carriage 106 reciprocates, the inks are discharged from the recording heads to record images on the recording medium. When the recording heads 201 to 204 are performing a non-recording operation, such as a recovery operation, the carriage 106 is controlled to move to a home position "h" shown in a dotted line in FIG. 1 for standby.

Upon receiving a recording start instruction, the recording heads 201 to 204, standing by at the home position "h" illustrated in FIG. 1, move in the X direction in FIG. 1 along with the carriage 106, while at the same time discharging the inks to record an image on the recording medium 107. By a single movement (scan) of the recording heads, recording is carried out on a region of the recording medium, whose width corresponds to an array range (length) of the discharge ports of the recording heads 201 to 204. After the recording operation by one scan movement of the carriage 106 in a main scanning direction (X direction) is completed, the carriage 106 returns to the home position "h" before executing the recording operation again by the recording heads 201 to 204 as it scans in the X direction in FIG. 1. Before subsequent recording scan begins after the preceding recording scan has been completed, the conveying roller 103 rotates to feed the recording medium in a sub-scanning direction (Y direction) perpendicular to the main scanning direction. By alternately repeating the recording scan of the recording heads and the feeding of the recording medium 107, recording of an image on the recording medium 107 is completed. The recording operation of discharging the inks from the recording heads 201 to 204 is controlled by a control unit described below.

In the above-described example, description has been given to, what is called unidirectional recording, in which the recording operation is executed only when the recording heads scan in a forward direction. The embodiments, however, are also applied to what is called bidirectional recording, in which the recording heads execute recording operation during both the scanning in the forward direction and the scanning in the backward direction. While in the above-described example the ink tanks 205 to 208 and the recording heads 201 to 104 are mounted on the carriage 106 so that they are separable from each other. However, a mode, in which a cartridge having the ink tanks 205 to 208 and the recording heads 201 to 204 formed integral is mounted on the carriage, may be also adopted. Furthermore, a mode, in which a multicolor integral head capable of discharging multicolor inks from a single recording head is mounted on the carriage, may be adopted.

Figure 2:
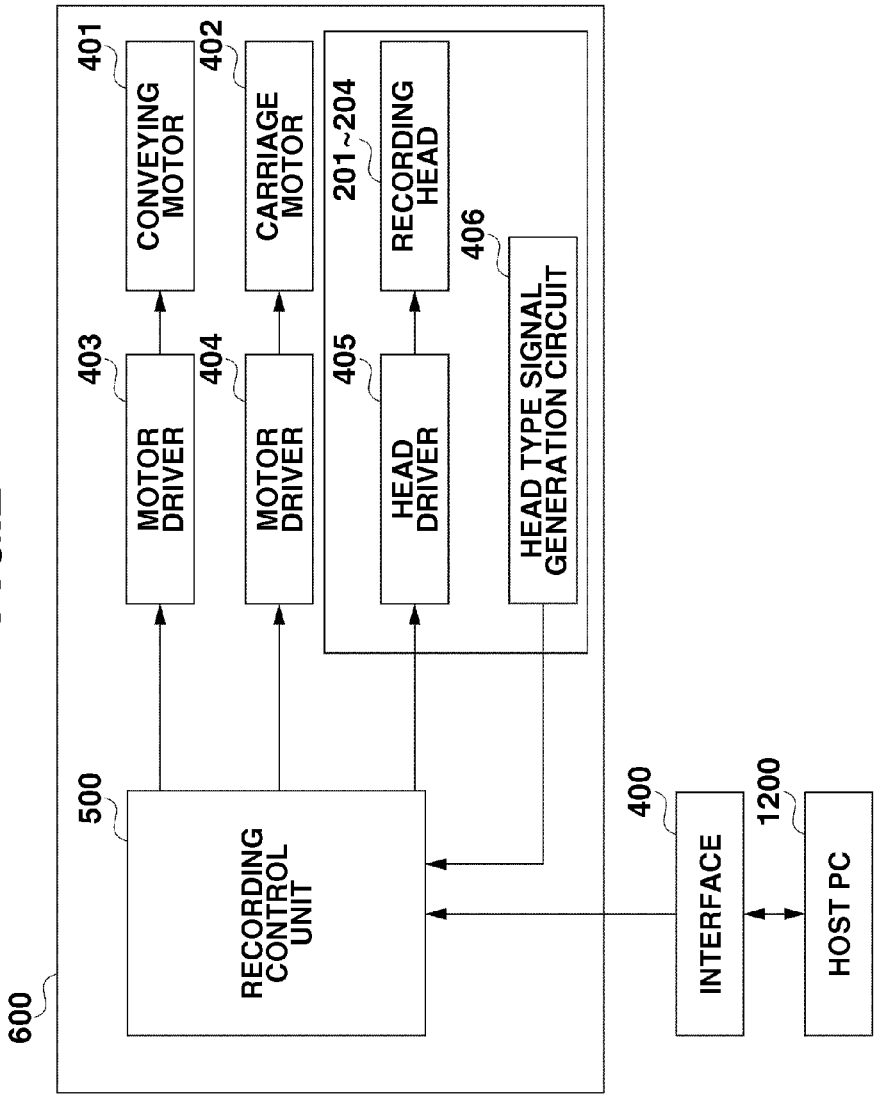
FIG. 2 is an electrical block diagram illustrating a schematic configuration of a recording control circuit of the inkjet recording apparatus.

FIG. 2 is a block diagram illustrating a schematic configuration of a recording control system circuit of the color inkjet recording apparatus illustrated in FIG. 1. An inkjet recording apparatus 600 is connected to a data supply apparatus such as a host computer (hereinafter, a host personal computer (PC)) 1200, via an interface 400. Control signals associated with various types of data and recording operation transmitted from the data supply apparatus are input into a recording control unit 500 of the inkjet recording apparatus 600. The recording control unit 500 controls motor drivers 403 and 404 and a head driver 405 described below in response to the control signals input via the interface 400. Further, the recording control unit 500 performs processing of image data to be input (e.g., data processing illustrated in FIG. 4, FIG. 5, FIG. 9, and FIG. 10) and processing of signals input from a head type signal generation circuit 406 described below. A conveying motor 401 is used to rotate a conveying roller 103 for conveyance of the recording medium 107. A carriage motor 402 is used to cause the carriage 106 mounting the recording heads 201 to 204 to reciprocally move. Motor drivers 403 and 404 are used to drive the conveying motor 401 and the carriage motor 402, respectively. The head driver 405 drives the recording heads 201 to 204, and plural head drivers are provided in response to a number of the recording heads. Further, the head type signal generation circuit 406 supplies signals indicating type and number of the recording heads 201 to 204 mounted on the carriage 106 to the recording control unit 500.

In the first exemplary embodiment, attribute information composed of characters, line drawings, and non-attributes (other than characters and line drawings) and color of an image that becomes a processing target are discriminated, and with respect to the image of which attribute has been discriminated as character or line drawing, the non-edge portions thereof are detected. Then, a thinning mask for thinning data of the thus detected non-edge portions is selected depending on color of a processing target (black/color), thereby a thinning ratio depending on color of the processing target is set. More specifically, if a thinning ratio when processing target color is black (K) is "A", and if a thinning ratio when processing target color is color (e.g., is a color other than black) is "B", the thinning ratio is set so that a relationship of A>B Equation (1) is satisfied. In other words, the thinning ratio when the color information indicates color ("B") is lower than the thinning ratio when the color information indicates black ("A").

By thus varying the thinning ratio of the non-edge portions depending on the processing target color, color deterioration along with reduction of image density, which occurs when color of an image is changed, can be suppressed.

Hereinbelow, this effect will be described with reference to FIGS. 3A to 3G.

Figure 3A:
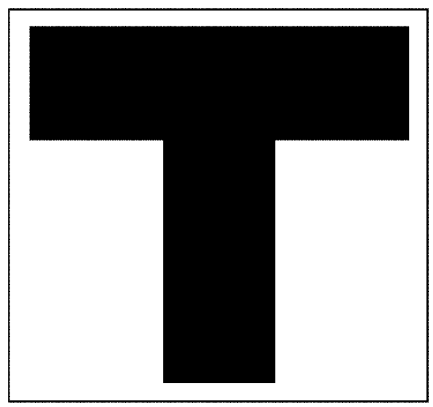
FIGS. 3A to 3G are diagrammatic views of thinned images.
Figure 3E:
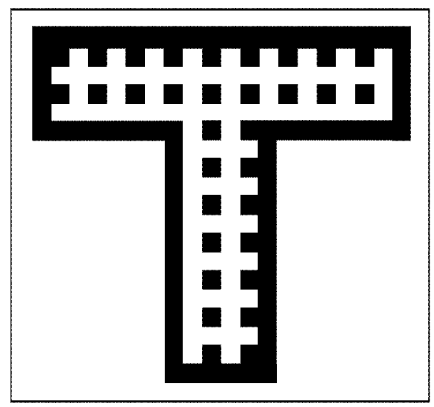
Figure 3B:
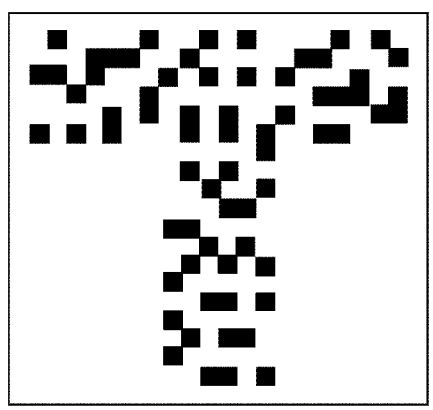
Figure 3F:
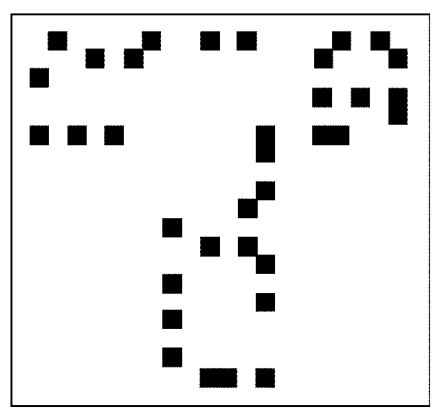
Figure 3C:
Figure 3D:
Figure 3G:
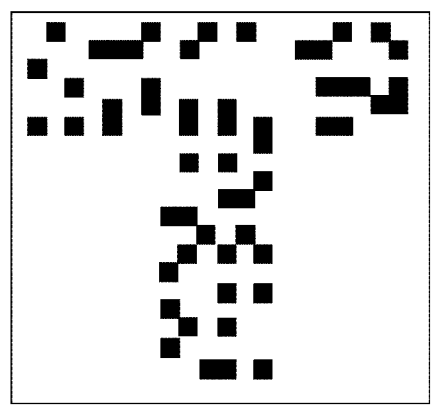

FIGS. 3A to 3G are conceptual diagrams representing thinned images (hereinafter, referred to as a "non-edge portion thinned image") obtained by thinning non-edge portions of images surrounded by edge portions. The edge portion of an image includes those dot positions (pixels configured to record dots) on the desired outer boundary of the image and the non-edge portions are dot positions within the edge portions. Thinning non-edge portions includes removing internal dots recorded in pixels using a mask, for example. This may reduce a dot recording density and, in turn, reduce processing load. FIGS. 3A and 3B illustrate input image data. More specifically, FIG. 3A illustrates data of a solid image (dark character) with a recording duty ratio of 100%, and FIG. 3B illustrates data of an image (light character) with a lower recording duty ratio (dot recording density) (of about 31%) than the image in FIG. 3A. FIGS. 3C and 3D illustrate thinning masks. More specifically, FIG. 3C illustrates a thinning mask of 75% thinning ratio, and FIG. 3D illustrates a thinning mask of 25% thinning ratio. FIGS. 3E to 3G illustrate non-edge portion thinned images. More specifically, FIG. 3E illustrates a non-edge portion thinned image obtained by thinning the non-edge portion of the image in FIG. 3A using the thinning mask in FIG. 3C. FIG. 3F illustrates a non-edge portion thinned image obtained by thinning the non-edge portion of the image in FIG. 3B using the thinning mask in FIG. 3C. FIG. 3G illustrates a non-edge portion thinned image obtained by thinning the non-edge portion in FIG. 3B using the thinning mask in FIG. 3D. By way of example, the non-edge portion of the image in FIG. 3A is reduced from a recording duty ratio of 100% to a recording duty ratio of 25% by using a thinning mask having a 75% thinning ratio.

Referring to FIG. 3F, dots are thinned to such a degree that an original image (character) cannot be discriminated, or can be barely discriminated, that is, image quality has become worse. On the other hand, referring to FIG. 3G, it is much more possible to discriminate the original image (character) than that in FIG. 3F. From the above description, in the case of reducing the number of recording dots of the image in FIG. 3B (light character), while maintaining image quality, it can be understood that FIG. 3G is more suitable than FIG. 3F. In other words, in order to keep a certain range of an image quality, while reducing the number of recording dots whatever the number of recording dots of input image, a thinning ratio set for the non-edge portions of the image with smaller number of recording dots of the input image needs to be lower than a thinning ratio set for the non-edge portions of the image with greater number of recording dots of the input image. That is to say, for an input image that may have one of a first dot recording density (FIG. 3A) and a second dot recording density (FIG. 3B) that is less than the first dot recording density, the non-edge portion thinning mask used on the input image should have a smaller thinning ratio (e.g., 25%) when the input image has the second dot recording density (e.g., 31%) than when the input image has the first dot recording density (e.g., 100%). Here, the thinning ration is a function of a dot recording density for an input image.

When such setting of the thinning ratio is implemented in an actual recording apparatus, it is a good idea to count the number of recording dots, for each image surrounded by an edge portion, which makes up the image, and to set the thinning ratio for each image. However, if a configuration for performing such detailed setting of the thinning ratio is adopted, processing load will eventually become high, and processing time will also become long.

When the present inventors have studied a configuration for enabling high speed processing with a low processing load, it is found out that a good balance between reduction of the number of recording dots and prevention of deterioration of image quality can be achieved, by relatively simplified processing such as setting, for each ink color that makes up an image, a thinning ratio specific to the ink color in advance. That is, in a general document, most of black characters or black lines often form solid images with a dot recording duty ratio of 100%, but in most of color characters (e.g., non-black characters) or color line drawings, their dot recording duty ratio often falls short of 100%. This is due to that, in the case of expressing a color specified with multivalued RGB data for recording, using a general inkjet recording apparatus, the color has a dot recording duty ratio which often falls short of 100%. This is because, for example, blue represented by (RGB)=(0, 0, 255) is not expressed by (KCMY)=(0, 255, 255, 0), but often expressed by halftone such as (KCMY)=(0, 235, 192, 0).

From the above-described findings, the present inventors reached a conclusion that by adopting a configuration for setting, for an ink color of processing target, a thinning ratio suitable for the color, it is possible to provide an apparatus capable of performing high speed processing with much lower processing load than a configuration for counting the number of recording dots for each image to set the thinning ratio. More specifically, an apparatus for the above-described objectives can be provided by adopting a configuration for setting a thinning ratio for non-edge portions corresponding to non-K ink (color ink) to be lower than a thinning ratio for non-edge portions corresponding to black (K) ink. Hereinbelow, a specific configuration of such apparatus (image processing system) will be described.

Figure 4:
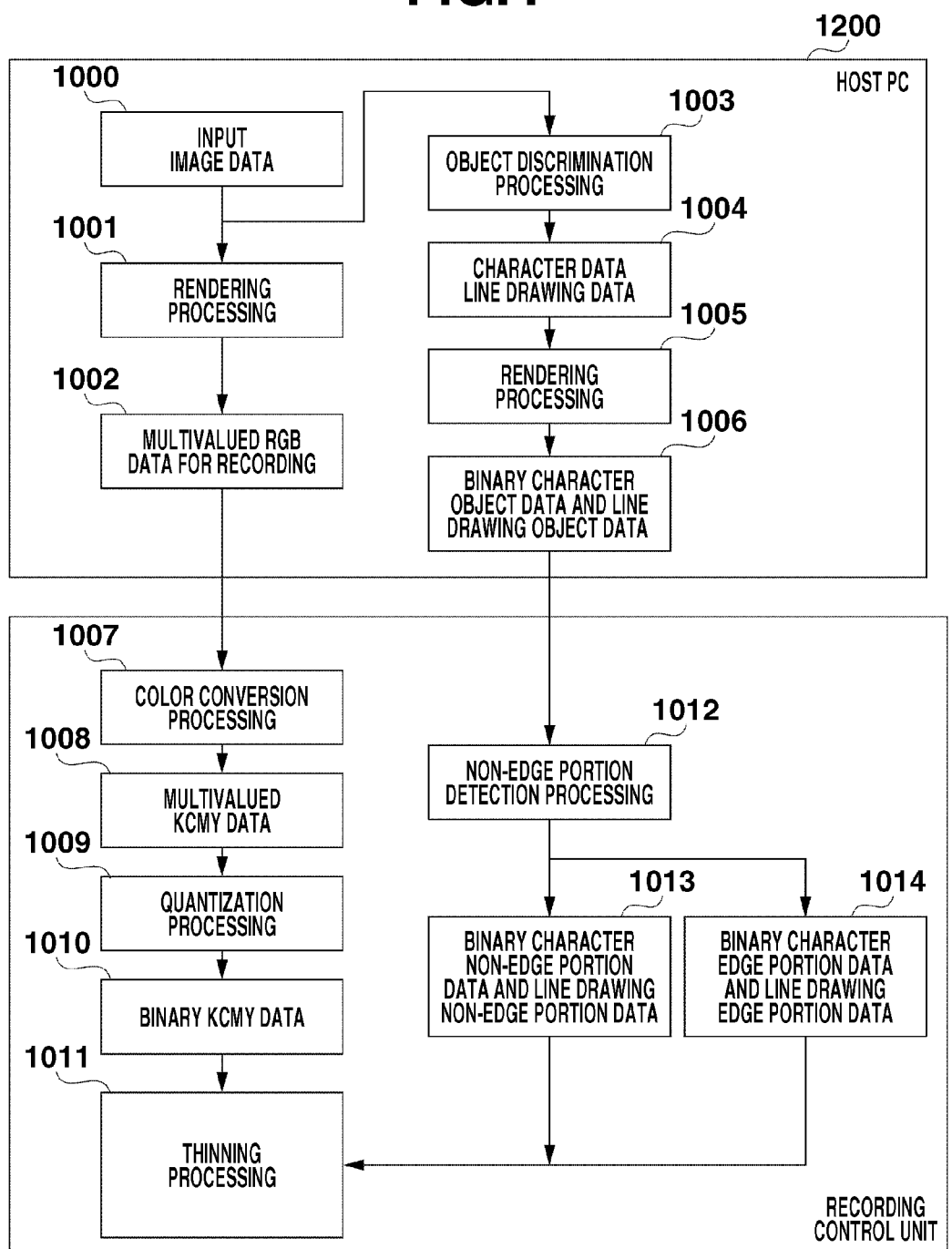
FIG. 4 is a block diagram illustrating a schematic configuration for performing image data processing in an image processing system according to a first exemplary embodiment.

FIG. 4 is a functional block diagram illustrating a schematic configuration for performing image data processing in the image processing system comprised of the inkjet recording apparatus and the host PC. The recording control unit 500 of the inkjet recording apparatus performs processing of data transferred from the host PC 1200, in which a printer driver is installed via the interface 400 in FIG. 2.

In the host PC 1200, input image data 1000 is received from an application. The input image data 1000 includes information (attribute information of images) concerning types of image constitutional elements. First, the received input image data 1000 is subjected to rendering processing 1001 at 1200 dpi resolution. Thereby, multivalued RGB data for recording 1002 is generated. In the present exemplary embodiment, the multivalued RGB data for recording 1002 is 256-value data. On the other hand, characters and line drawings as a plurality of types of image constitutional elements included within the images to be recorded are subjected to object discrimination processing 1003, based on the input image data 1000. Character data may include any sign or symbol, including those used to represent speech, and line drawing data may include a mark (at least one of straight or curved) that is long relative to its width. The object discrimination processing 1003 may distinguish character data and line drawing data 1004 from other data included within the images to be recorded through discrimination. Character data and line drawing data 1004 discriminated by the object discrimination processing 1003 are subjected to rendering processing 1005 at the same resolution as that of the rendering processing 1001. Thereby, binary character object data and binary line drawing object data 1006 with resolution of 1200 dpi are generated. The multivalued RGB data for recording 1002 and the binary character object data and binary line drawing object data 1006 generated as above are transferred to the recording control unit 500.

In the recording control unit 500, color conversion processing 1007 for converting the multivalued RGB data for recording 1002 into multivalued (256-value) KCMY data 1008 is performed. Next, the multivalued (256-value) KCMY data 1008 is quantized (binarized) by quantization processing 1009 (e.g., error diffusion). Consequently, binary KCMY data 1010 with resolution of 1200 dpi is generated. On the other hand, non-edge portion detection processing 1012 is performed on the binary character object data and binary line drawing object data 1006 transferred to the recording control unit 500. Consequently, binary character non-edge portion data and binary line drawing non-edge portion data 1013, and binary character edge portion data and binary line drawing edge portion data 1014 are generated.

As a final step, thinning processing 1011 described below is performed based on the binary KCMY data 1010, and the binary character non-edge portion data and binary line drawing non-edge portion data 1013, and the binary character edge portion data and binary line drawing edge portion data 1014.

Here, edge processing according to the present exemplary embodiment will be described. In Japanese Patent Application Laid-Open No. 2007-176158 described above, edge detection processing for detecting edge regions and non-edge regions uses a method of inputting binary data. In this edge detection processing, in the case of black 100% (solid) character, the recording duty ratio often becomes 100%, and as a result, edge regions can be appropriately detected. However, when edge detection is performed from the binary data, on images in which a recording duty ratio of the binary data such as, for example, color character becomes equal to or smaller than 100%, there is a possibility that non-edge regions may be detected as edge regions. This is because pixels, which do not record dots, exist in the non-edge regions. In addition, if pixels, which do not record dots, exist also in edge regions, the edge regions will eventually become unable to be appropriately detected.

On the other hand, edge processing for inputting the multivalued data is also known. In this case, although the edge portions can be appropriately detected, processing load is higher than a case where the edge detection processing is performed using binary data. Therefore, in a case where the edge processing with multivalued data is realized using hardware, circuit scale will become large, and product cost will become high. That is, in order to perform edge processing with the multivalued data, it is necessary to use a high-spec PC or recording apparatus, or to take a long processing time.

Therefore, by using edge processing method according to the present exemplary embodiment, in a case where edge detection processing is performed on an image of which binary recording duty ratio becomes equal to or smaller than 100%, such as characters or line drawings or the like of color or grey color, it becomes possible to appropriately detect edge regions and non-edge regions. Furthermore, processing at a lower cost and in a shorter time can be realized, as compared with a case where edge detection processing for detecting edge regions from the multivalued data is performed.

In the present exemplary embodiment, object data is generated by a printer driver. A digital document generated by application or the like is expressed by a command system such as a page-description language (PDL), and the command is broadly composed of three objects. The first is a character object, the second is a graphic object such as vector data including graphic or free curve, and the third is a photo or printed product read out by a scanner or the like, or a bitmap object such as image data. Line drawing object data used below is a kind of graphic object. These are included in the input image data 1000.

An object, if a character (symbol), is composed of data such as a character code that may pair each character from a given repertoire with something else for identifying what character, a font having a style of a particular typeface for defining shape of character, size information representing size of character (such as a 10-point size of the character), and color information representing color of character (such as a 0, 235, 192, 0 color from the KCMY color model) or the like. That is, the object is not information which the recording apparatus can directly interpret as it is. The printer driver controls an interface with a printer, converts the above data into two-dimensional bitmap data which allows correct interpretation, namely, the multivalued RGB data for recording 1002, and at the same time outputs the character data and line drawing data 1004. The term "character data and line drawing data" refers to two-dimensional information formed by causing each pixel to have attribute information which each pixel has. Accordingly, the multivalued RGB data for recording 1002 and the character data and line drawing data 1004 are generated such that association with each pixel can be established.

In the present exemplary embodiment, object data is handled by distinguishing between character and line drawing.

Therefore, data transferred from the host PC 1200 to the recording control unit 500 requires 8×3=24 bits as the multivalued RGB data for recording 1002, and 1 bit as binary character object data, 1 bit as binary line drawing object data, that is, two pieces of one-bit information. In other words, information amount per pixel is 24+2=26 bits in total. As a matter of course, object data may be written as 2 bits by bringing two objects together, or a number of bits of 3 or more which enables handling object data more than necessary in the present exemplary embodiment may be used. As will be described below, after the non-edge portion detection processing has been performed, in order to retain non-edge portion data/edge portion data, object data each requires four pieces of one-bit information for object data inside the recording control unit 500. Further, in the present exemplary embodiment, the multivalued RGB data for recording takes 8×3=24 bits, 10×3=30 bits, 12×3=36 bits, 16×3=48 bits or the like may be used. Further, the multivalued CMYK data for recording may be used instead of the multivalued RGB data for recording. When the multivalued CMYK data for recording is input, color conversion processing 1007 may be performed, or may not be performed.

Figure 12A:
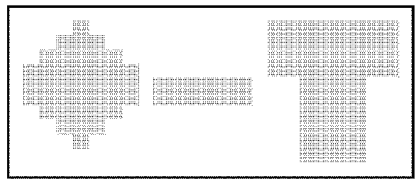
FIGS. 12A to 12J are diagrammatic views of object data.
Figure 12B:
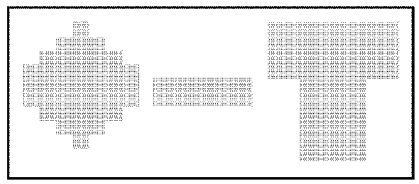
Figure 12E:
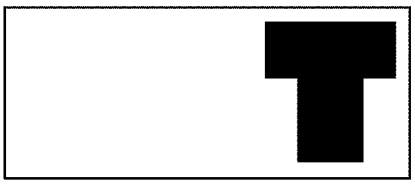
Figure 12C:
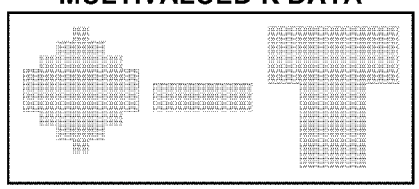
Figure 12F:
Figure 12D:
Figure 12G:
Figure 12H:
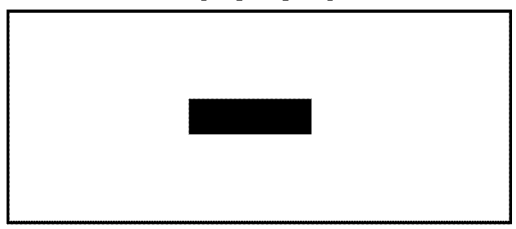
Figure 12I:
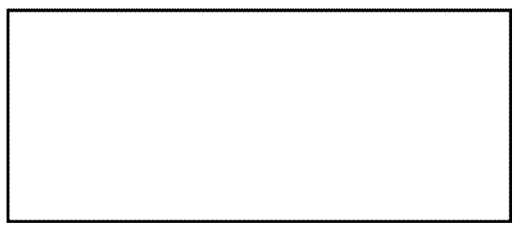
Figure 12J:
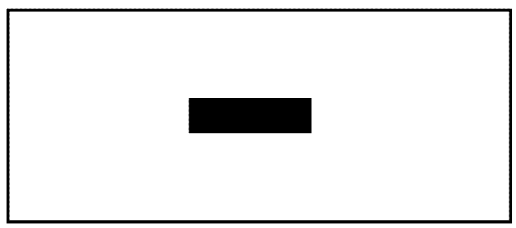

FIGS. 12A to 12J illustrate a flow of object data and image data. The input image data 1000 is illustrated in FIG. 12A. Assume that a 50% duty image exists in hatched image regions. On the basis of the data, data illustrated in FIG. 12B as the multivalued RGB data for recording 1002, the data illustrated in FIG. 12E and the data illustrated in FIG. 12H as the binary character object data and binary line drawing object data 1006 are generated. The data illustrated in FIG. 12C as the multivalued KCMY data 1008 is generated, by the color conversion processing from the data illustrated in FIG. 12B as the multivalued RGB data for recording 1002, and further data illustrated in FIG. 12D as the binary KCMY data 1010 is generated by quantization processing. From data illustrated in FIG. 12E and data illustrated in FIG. 12H as the binary character object data and binary line drawing object data 1006, the data illustrated in FIG. 12F and the data illustrated in FIG. 12I as the binary character non-edge portion data and binary line drawing non-edge portion data 1013, the data illustrated in FIG. 12G and the data illustrated in FIG. 12J as the binary character edge portion data and binary line drawing edge portion data 1014 are generated.

Figure 5:
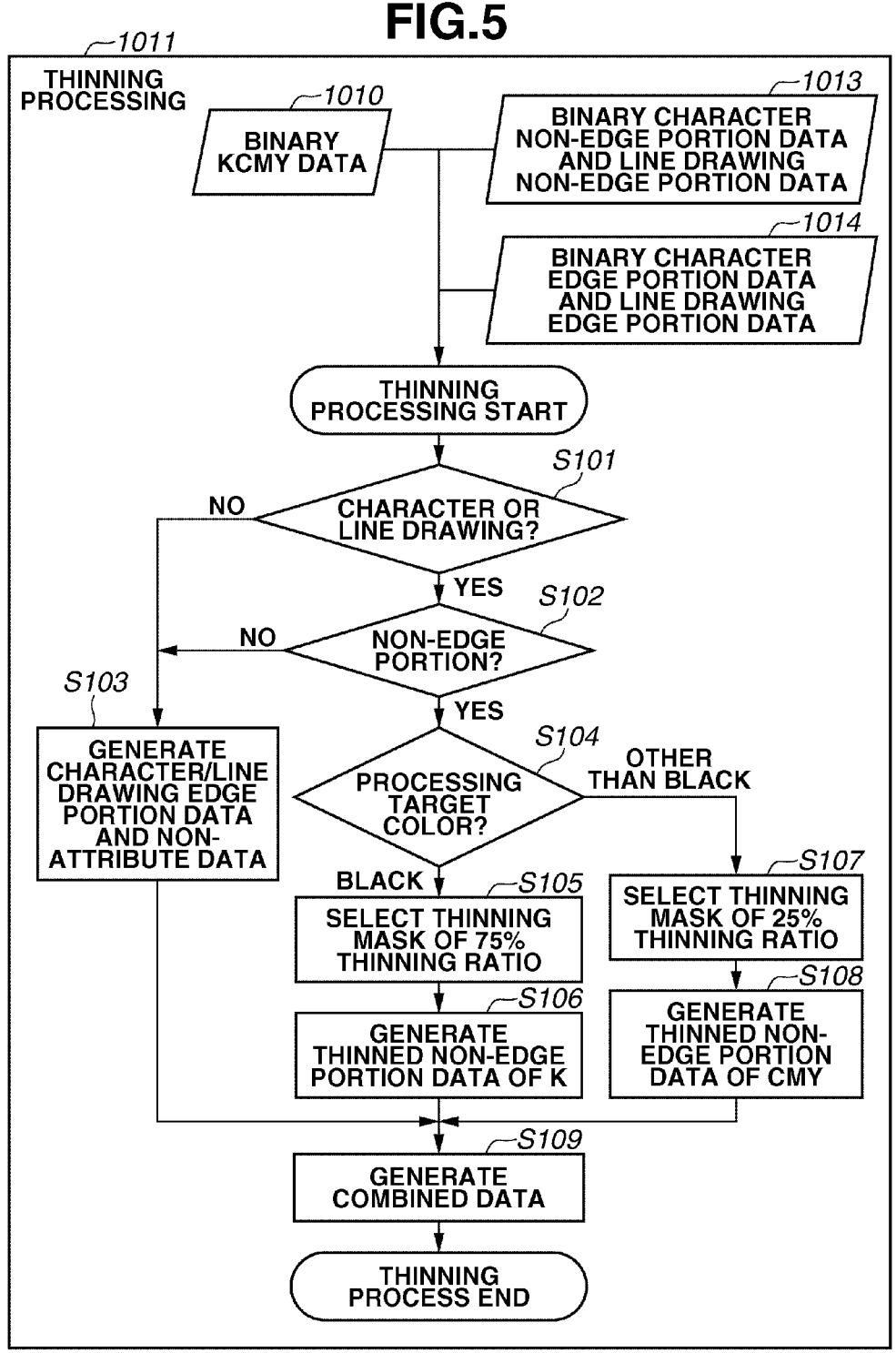
FIG. 5 is a flowchart illustrating a sequence of thinning processing of FIG. 4.

FIG. 5 is a flowchart illustrating a procedure for the thinning processing 1011 illustrated in FIG. 4. As illustrated in FIG. 4 and FIG. 5, the thinning processing is started using the binary KCMY data 1010 and the binary character non-edge portion data and binary line drawing non-edge portion data 1013, and the binary character edge portion data and binary line drawing edge portion data 1014 as input data.

First, in step S101, the recording control unit 500 determines whether an image attribute of a pixel of interest is character or line drawing. Subsequently, in step S102, the recording control unit 500 determines whether the image is non-edge portion on the image data determined as character or line drawing. In step S104, the recording control unit 500 determines processing target color on the image data further determined as the non-edge portion. If it is determined that the processing target color is black (K) (BLACK in step S104), then in step S105, the recording control unit 500 selects a thinning mask of 75% thinning ratio 4001 illustrated in FIG. 7G, as a mask for thinning the non-edge portion image data of K. In an example, black may a black in a subtractive color model such as key black (K) in the KCMY color model. In another example, black may a black in an additive color model such as the RGB color model. In yet another example, black may be a black in any color model that represents colors as tuples of numbers. However, black is not limited to color models and black may be black ink, black may be a result of mixing cyan, magenta and yellow primaries, black may be an absence of light (such as when there are minimal photons of colors), and black may be a result of absorbing the colors of the visible spectrum to not reflect any of them at a level of being detected with typical equipment. Black may be a black that exists as a pigment or as a molecular coloring agent, and may include carbon black, charcoal black, ebony, ivory black, onyx, rich black, composite black, or process black. While in physics a black body is a perfect absorber of light, black in a context of an image processing apparatus still may reflect some light, whether black is a result of subtracting brightness from white, a result of a combination of several pigments that collectively absorb most colors, or otherwise.

Next, in step S106, the recording control unit 500 generates thinned character/line drawing data of K of the pixel of interest, by thinning the non-edge portion image data of K using this thinning mask. A set of data generated by performing such processing on a plurality of pixels is taken as non-edge portion thinned data of K. On the other hand, if it is determined that processing target color is other than black (OTHER THAN BLACK in step S104), then in step S107, the recording control unit 500 selects a thinning mask of 25% thinning ratio 4002 illustrated in FIG. 7H, as a mask for thinning non-edge portion image data of CMY. Under the KCMY color model, for example, some combinations of CMY and some combinations of CMYK may be considered colors other than black (K). In an example, the recording control unit 500 determines a first thinning ratio when the color information indicates black and determines a second thinning ratio when the color information indicates a color other than black such that the second thinning ratio is lower than the first thinning ratio. In another example, when the color information indicates a first color, the recording control unit 500 selects a first thinning ratio and when the color information indicates a second color having a brightness located along a continuum from black to white that is greater than the first color, the recording control unit 500 selects a second thinning ratio such that the second thinning ratio is lower (or less) than the first thinning ratio.

Next, in step S108, the recording control unit 500 generates thinned character/line drawing data of CMY of the pixel of interest, by thinning the non-edge portion image data of CMY, using the thinning mask. A set of data generated by performing such processing on a plurality of pixels is taken as the non-edge portion thinned data of CMY.

If an image attribute of a pixel of interest is not character or line drawing (step S101) or if the image is not non-edge portion on the image data determined as character or line drawing (step S102), the thinning process proceeds to step S103. In step S103, a set of pixels of which image attribute being determined as other than character or line drawing (in other words, non-attribute) in step S101 is taken as non-attribute data, and a set of pixels determined as edge portion in step S102 is taken as edge portion data of character/line drawing.

Finally, in step S109, recording data of KCMY is generated by combining the edge portions data of character/line drawing and non-attribute data generated in step S103, the non-edge portion thinned data of K generated in step S106, and the non-edge portion thinned data of CMY generated in step S108. Accordingly, the thinning processing is terminated.

In the present exemplary embodiment, regarding data of non-attribute determined as neither character nor line drawing, and edge portion data of character/line drawing, although they are not a target of the thinning processing, the embodiments, however, are is not intended to preclude a mode in which the thinning processing is performed on these pieces of data. As in a second exemplary embodiment or a fourth exemplary embodiment described below, these pieces of data may be a target of the thinning processing. In this case, a thinning ratio suitable for these pieces of data will be separately set.

Figure 6A:
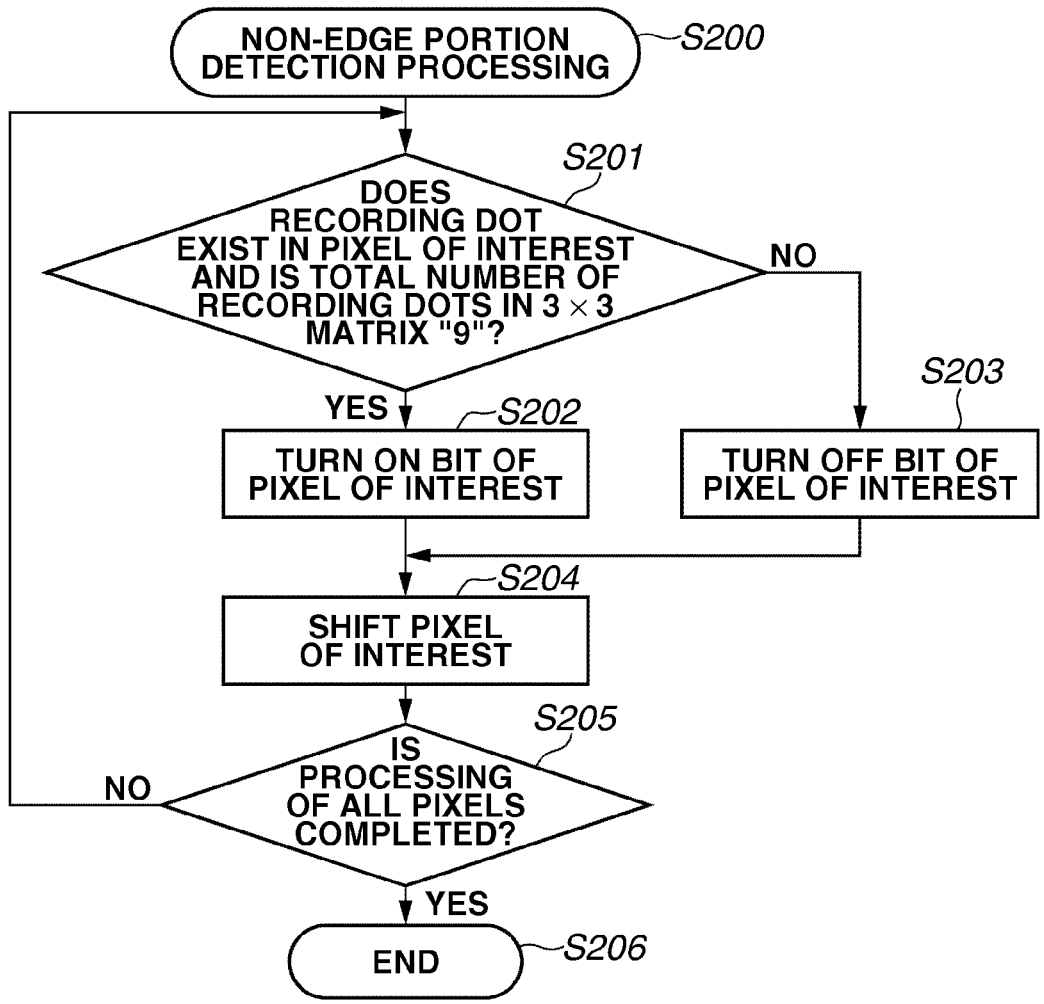
FIGS. 6A to 6C are explanatory diagrams of non-edge portion detection processing in FIG. 4.
Figure 6B:
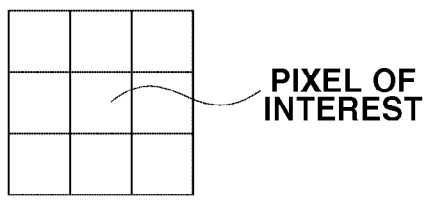
Figure 6C:
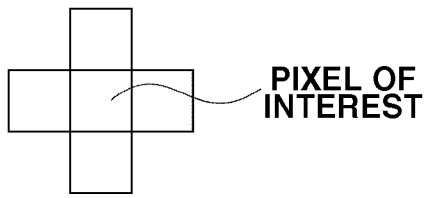

FIG. 6A is a flowchart illustrating non-edge portion detection processing 1012 illustrated in FIG. 4. FIGS. 6B and 6C are diagrammatic diagrams illustrating a relationship between a matrix usable in this detection processing and the pixel of interest. First, in step S201, the recording control unit 500 determines whether data indicating dots to be recorded in the pixel of interest of image data exists, and the number of recording dots within a 3×3 matrix centering on the pixel of interest is "9". If the total number of recording dots is "9" (YES in step S201), then in step S202, the recording control unit 500 turns on the bit of the pixel of interest. If the total number of recording dots is not "9" (NO in step S201), then in step S203, the recording control unit 500 turns off the bit of the pixel of interest. Subsequently, in step S204, the recording control unit 500 shifts the pixel of interest of the image data by one pixel in a scanning direction. In step S205, the recording control unit 500, while performing repeatedly this operation, determines whether the detection processing on all pixels of the image data is completed. If completed (YES in step S205), then in step S206, the recording control unit 500 terminates the detection processing of the non-edge portions of the image data, and if not completed (NO in step S205), returns the processing to step S201, and repeats the above-described processing.

Although a use of the matrix illustrated in FIG. 6B has been herein described, the structure of a matrix usable in the detection processing is not limited to this. For example, using a matrix consisting of the pixel of interest and pixels adjoining thereto as illustrated in FIG. 6C, it is determined whether the number of recording dots within the matrix is "5". If it is determined as "5", the pixel of interest may be also detected as a non-edge portion.

Figure 7A:
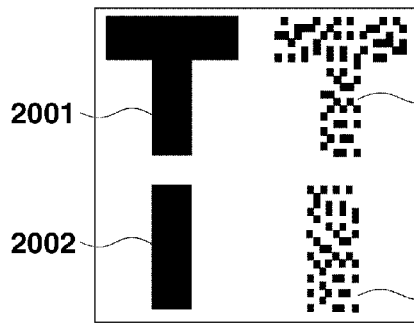
Figure 7D:
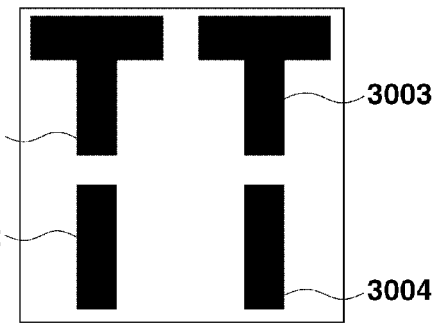

Next, the above-described non-edge detection processing and thinning processing described in FIG. 4 to FIGS. 6A to 6C will be described with reference to FIG. 7A to 7J. FIGS. 7A to 7J illustrate diagrammatically the above-described detection processing of non-edge portions. FIG. 7A illustrates the binary KCMY data 1010 illustrated in FIG. 4 and FIG. 5. The binary KCMY data 1010 is composed of character data of K 2001, line drawing data of K 2002, character data of C 2003 corresponding to color being not K, and line drawing data of C 2004. FIG. 7D illustrates the binary character/line drawing object data 1006 illustrated in FIG. 4, and the data 1006 is composed of binary character object data 3001 and 3003, and binary line drawing object data 3002 and 3004. These pieces of object data are solid images with a recording duty ratio of 100%. As described in FIGS. 6A to 6C, the detection processing of the non-edge portions is performed on the binary character/line drawing object data 3001 to 3004 illustrated in FIG. 7D, while shifting the pixel of interest one pixel at a time. If the number of recording dots within the 3×3 matrix which includes the pixel of interest is "9", bits of the pixel of interest are turned on bit by bit. An aggregate of pixels in which the bits thus turned on becomes binary character non-edge portion data 3009 and 3011, and binary line drawing non-edge portion data 3010 and 3012 illustrated in FIG. 7F. Furthermore, binary character edge portion data 3005 and 3007, and binary line drawing edge portion data 3006 and 3008 illustrated in FIG. 7E are generated, by performing an exclusive logical sum (EX-OR) operation of the binary character non-edge portion data 3009 and 3011 and binary line drawing non-edge portion data 3010 and 3012 illustrated in FIG. 7F, and the binary character object data 3001 and 3003 and the binary line drawing object data 3002 and 3004 illustrated in FIG. 7D.

In this case, although the edge portion is detected as one pixel of contour, and the non-edge portion is detected as pixels excluding one pixel of contour, the embodiments are not limited to this, but the edge portion may be detected as a plurality of pixels. It becomes possible to detect the edge portion as a plurality of pixels, by performing repeatedly the non-edge portion detection processing on previously generated non-edge portion data. Alternatively, although the non-edge portion is herein detected, the non-edge portion data may be generated by detecting the edge portion and performing an exclusive logical sum (EX-OR) operation thereof.

Subsequently, the thinning processing described in FIG. 5 will be described referring to FIGS. 7A to 7J. FIG. 7G illustrates a thinning mask of 75% thinning ratio selected in step S105 in FIG. 5. FIG. 7H illustrates a thinning mask of 25% thinning ratio selected in step S107 in FIG. 5. In step S101 in FIG. 5, since the character data of K 2001, the line drawing data of K 2002, the character data of C2003, and the line drawing data of C 2004 in FIG. 7A are characters or line drawings, the processing proceeds to step S102 in FIG. 5. In step S102 in FIG. 5, the recording control unit 500 determines the edge portion or the non-edge portion using the edge portion data and the non-edge portion data in FIG. 7E and FIG. 7F.

Figure 7B:
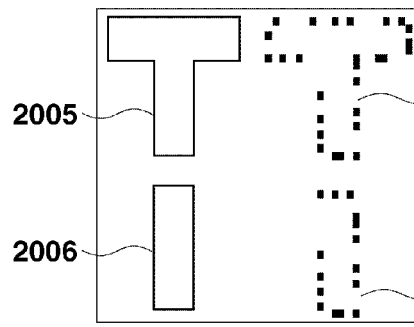
Figure 7E:
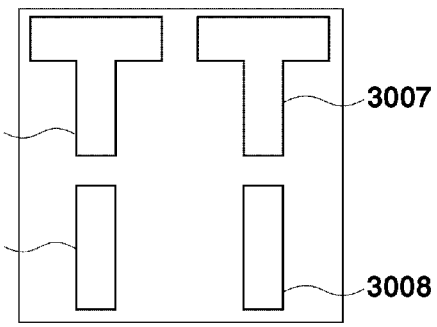
Figure 7C:
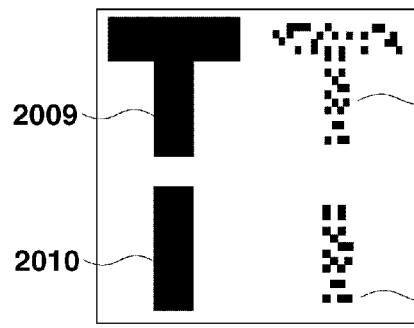
Figure 7F:
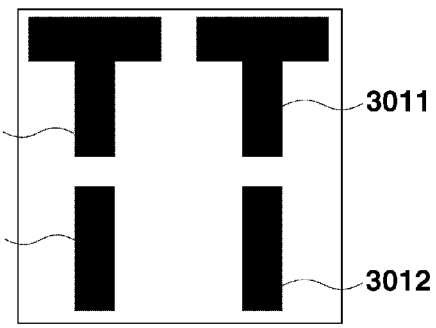

In step S103 in FIG. 5, the edge portion data of characters/line drawings 2005 to 2008 illustrated in FIG. 7B are generated, by performing a logical product (AND) operation of the edge portion data 3005 to 3008 illustrated in FIG. 7E and data in FIG. 7A. In this process, in FIG. 7B, character edge portion data of K 2005, line drawing edge portion data of K 2006, character edge portion data of C 2007, and line drawing edge portion data of C 2008 are illustrated. On the other hand, using the non-edge portion data 3009 to 3012 illustrated in FIG. 7F, the non-edge portion data of characters/line drawings 2009 to 2012 illustrated in FIG. 7C is generated by obtaining a logical product (AND) of the data in FIG. 7F and the data in FIG. 7A. In this process, in FIG. 7C, character non-edge portion data of K 2009, line drawing non-edge portion data of K 2010, character non-edge portion data of C 2011, and line drawing non-edge portion data of C 2012 are illustrated.

In step S106 in FIG. 5, using the data of K 2009 and 2010 out of data in FIG. 7C, the non-edge portion thinned data of K 2013 and 2014 in FIG. 7I is obtained by applying the thinning mask of 75% thinning ratio 4001 illustrated in FIG. 7G. Further, in step S108 in FIG. 5, using the data of C 2011 and 2012, out of data in FIG. 7C, non-edge portion thinned data of C 2015 and 2016 in FIG. 7I is obtained by applying the thinning mask of 25% thinning ratio 4002 illustrated in FIG. 7H. Finally, in step S109 in FIG. 5, recording data in FIG. 7J is obtained by combining the data in FIG. 7B and the data in FIG. 7I.

Consequently, regarding characters/line drawings formed with ink for color (color which is not K), a thinning ratio of the non-edge portion can be set lower than that of character/line drawing formed with ink for black (K). Therefore, this can prevent the non-edge portion from leading to color deterioration along with reduction of image density that may occur if the same thinning ratio is set, without depending on the number of recording dots of an image, as described in FIG. 3.

In the present exemplary embodiment, non-edge portion detection processing is performed, based on the binary object data 1006 (3001 to 3004), instead of the binary KCMY data 1010, and the reason is as follows. The binary image data (i.e., 2003 to 2004) representing character or line drawing of color does not form a solid image with dot recording duty ratio of 100% (that is, there is a high possibility that non-recorded pixels may exist within the non-edge portion). If the non-edge portion detection processing is performed on the basis of such binary image data that non-recorded pixels exist within the non-edge portion, even the inside of character will be eventually detected as a non-edge portion. If so, dots inside the character that is intended to be thinned will remain without being thinned, and as a result, an area with a high image density (OD value) inside the character will be generated, and nonuniformity of macro density will occur. When the non-uniformity of macro density inside the character occurs, it often makes one feel like that not a string of graphic but a plurality of different graphics contacts with each other. In order to avoid this, in the present exemplary embodiment, the non-edge portion detection processing is performed based on the binary character/line drawing object data 1006, instead of performing the non-edge portion detection based on the binary KCMY data.

According to the present exemplary embodiment as described above, a thinning ratio of non-edge portions is set variable depending on processing target color. Accordingly, it becomes possible to form a high-quality image with sharp edge portions and sufficient density of the non-edge portions, regardless of color of an image (character or line drawing in the present example). Further, the amount of a recording material used for formation of the non-edge portions is also reduced, and consequently a cost reduction effect can be obtained together.

When edge detection is performed, object data as information relating to attributes of images is acquired from the multivalued image data, edge detection processing for detecting edge/non-edge regions is performed on the basis of the object data, and then data indicating edge/non-edge regions is generated. Then, image data used to record the non-edge regions of the images is generated, based on the binary data obtained by converting multivalued image data, and data indicating generated non-edge regions. Processing for thinning the non-edge regions is performed based on the image data. In the present exemplary embodiment, the object data is acquired from the multivalued image data, but a mode for acquiring the binary image data and the object data of the image respectively may be used.

In the above-described first exemplary embodiment, thinning processing is not performed on non-attribute data, and edge portion data of characters and line drawings, but in a second exemplary embodiment, thinning processing is performed on non-attribute data. Regarding other aspects, the second exemplary embodiment is similar to the first exemplary embodiment.

Figure 8A:
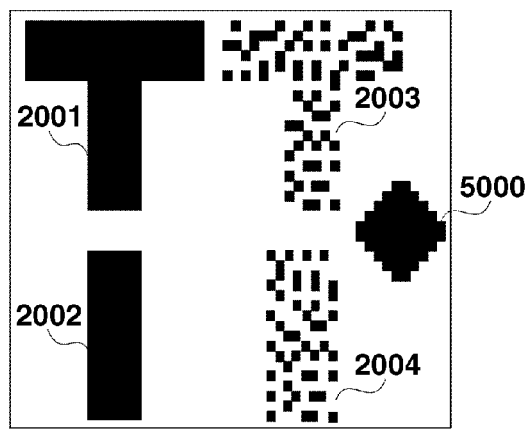
FIGS. 8A to 8C illustrate comparisons between recording data generated by data processing according to the first exemplary embodiment and recording data generated by data processing according to a second exemplary embodiment.
Figure 8B:
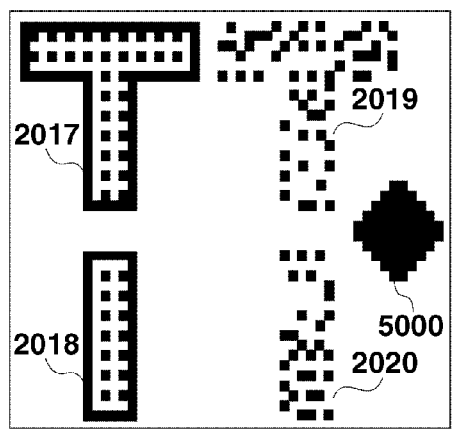
Figure 8C:
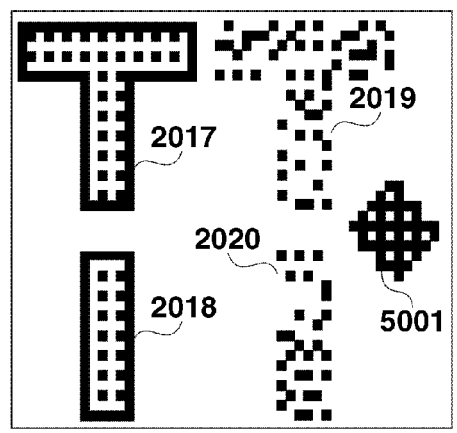

In the second exemplary embodiment, non-attributes other than characters and line drawings are discriminated by the object discrimination processing 1003 in FIG. 4, and thinning processing is performed on non-attribute data as a set of the pixels of interest determined as non-attributes in step S101 illustrated in FIG. 5, using a thinning mask of 25% thinning ratio, regardless of processing target color. After that, the non-attribute data having been subjected to the thinning processing is combined with the non-edge portion thinned data of K, the non-edge portion thinned data of CMY, and the character/line drawing edge portions data. In such a manner, the binary recording data is thus generated. FIGS. 8A to 8C are diagrams illustrating comparisons between recording data generated by data processing according to the first exemplary embodiment and recording data generated by data processing according to the second exemplary embodiment. Reference numerals 2001 to 2004, and 2017 to 2020 in FIGS. 8A to 8C refer to the same ones as the data in FIGS. 7A to 7J. FIG. 8A illustrates the binary KCMY data 1010, and the binary KCMY data 1010 is composed of the character data of K 2001, the line drawing data of K 2002, the character data of C 2003, the line drawing data of C 2004, and the non-attribute data 5000. FIG. 8B illustrates the recording data having been subjected to the thinning processing in accordance with data processing according to the first exemplary embodiment, which is composed of the data 2017 to 2020 in FIG. 7J and the non-attribute data 5000. FIG. 8C illustrates recording data having been subjected to the thinning processing in accordance with the data processing according to the second exemplary embodiment, which is composed of the data 2017 to 2020 in FIG. 7J, and the non-attribute data 5001 obtained by thinning the non-attribute data 5000 using the thinning mask of 25% thinning ratio.

In the second exemplary embodiment, a thinning ratio of the non-attribute data is set to 25%, which is the same as a thinning ratio of the non-edge portion data of color, but a thinning ratio of the non-attribute data is not limited to this, and the thinning ratios may be different between the non-attribute data and the non-edge portion data of color. In short, it is only necessary that the number of recording dots of the non-attribute data can be reduced.

According to the second exemplary embodiment as described above, thinning processing is also performed on the non-attribute data, in addition to the non-edge portion data of characters and line drawings, thereby lower running cost can be achieved than in the first exemplary embodiment.

Ina third exemplary embodiment, the size of character or thickness of line drawing is also determined, and a thinning ratio is set lower for a large character than a small character. Hereinbelow, descriptions will be given paying attention to difference from the first exemplary embodiment.

In the third exemplary embodiment, as a schematic configuration for performing image data processing, the configuration illustrated in FIG. 9 is used in place of the configuration in FIG. 4 used in the first exemplary embodiment. The feature of the configuration in FIG. 9 lies in having functions of character point number detection processing 1105 and line drawing point number detection processing 1205, which do not exist in FIG. 4. In the detection processing 1105 and 1205, information concerning point numbers of character data 1104 and line drawing data 1204 (size information) is acquired from the printer driver. Then, in object-dependent thinning processing 1311, in addition to the data used in the first exemplary embodiment (the binary KCMY data 1010, the binary character non-edge portion data 1110, the binary character edge portion data 1111, the binary line drawing non-edge portion data 1210, and the binary line drawing edge portion data 1211), information concerning character point number 1108 obtained in the character point number detection processing 1105 and information concerning line drawing point number 1208 obtained by the line drawing point number detection processing 1205 are also used.

Further, in the third exemplary embodiment, the flowchart illustrated in FIG. 10 is used as a flowchart for thinning processing, in place of the flowchart in FIG. 5 used in the first exemplary embodiment. As described below, in the present exemplary embodiment, when a thinning ratio is set, it is characterized by taking not only processing target color (black/color), but also point number of character or line drawing (size information) into account. More specifically, a thinning ratio is set such that a thinning ratio of a large character or bold line is smaller than a thinning ratio of a small character or thin line.

Figure 11A:
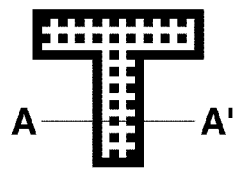
FIGS. 11A to 11F are diagrammatic views of thinned images and are conceptual views representing density distributions.
Figure 11B:
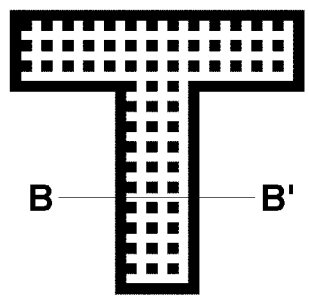
Figure 11C:
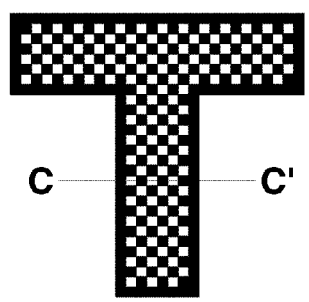
Figure 11D:
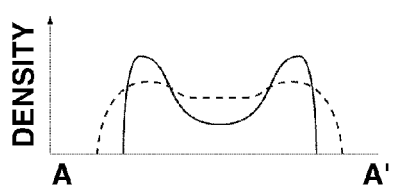
Figure 11E:
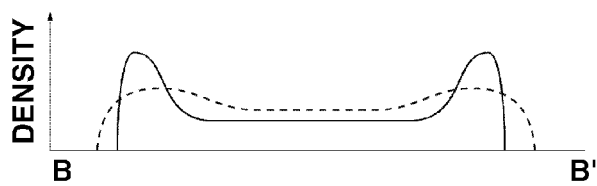
Figure 11F:
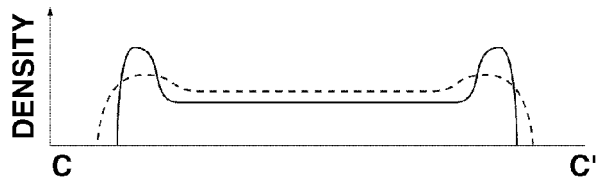

Now, the reason why a thinning ratio is varied according to the size of an image of characters or line drawings or the like will be described. FIGS. 11A to 11F are diagrammatic views of thinned images obtained by thinning non-edge portions of the images surrounded by edge portions (hereinafter, referred to as a "non-edge portion thinned image") and conceptual views representing their density distributions. FIGS. 11A to 11C illustrate diagrammatic views of the non-edge portion thinned images. FIGS. 11D to 11F illustrate conceptual views representing density distributions in FIG. 11A to 11C, respectively. FIG. 11A is a diagrammatic view of a non-edge portion thinned image obtained by thinning the non-edge portion of a small image at a certain thinning ratio. FIG. 11B is a diagrammatic view of a non-edge portion thinned image obtained by thinning the non-edge portion of a large image at the same thinning ratio as that in FIG. 11A. FIG. 11C is a diagrammatic view of a non-edge portion thinned image obtained by thinning the non-edge portions of a large image at a lower thinning ratio than that in FIG. 11A. FIG. 11D illustrates density distribution between points A and A' in FIG. 11A. FIG. 11E illustrates density distribution between points B and B' in FIG. 11B. FIG. 11F illustrates density distribution between points C and C' in FIG. 11C. The solid line indicates image density (optical density (OD) value). On the other hand, the dotted line indicates macro-density. That is, when human visual characteristic is taken into account, density can be visually identified in a range of 0 to 8 cycles/mm, and for a printer of e.g., 1200 dpi, it corresponds to an area having a width of about 6 pixels or more. Therefore, it follows that human eyes watch the density of a plurality of pixels around a point of interest. Thus, the dotted line indicates a moving average of image densities of a plurality of pixels around the point of interest, that is, apparent density (macro-density), when the image is observed on a macro basis.

A central part in FIG. 11D, that is, a macro density of the non-edge portion of the small image is influenced by an OD value of the edge portion, and becomes higher than the OD value of the non-edge portion. Central parts in FIGS. 11E and 11F, that is, macro densities of the non-edge portions of the large images, are difficult to be influenced by the OD value of the edge portions, since a distance to the edge portion is long, and also are difficult to be higher than the OD value of the non-edge portion. For this reason, an OD value of the non-edge portion in FIG. 11D and an OD value of the non-edge portion in FIG. 11E are equal, but a macro density of the non-edge portion in FIG. 11D and a macro density the non-edge portion in FIG. 11E are different. In FIG. 11F, in which a higher OD value than that in FIG. 11E is realized by setting a thinning ratio of the non-edge portion lower than that in FIG. 11E, a macro density of the non-edge portion becomes higher than that in FIG. 11E.

In other words, in the large image, in order to obtain the same degree of a macro density as a macro density of the small image illustrated in FIG. 11D, an OD value illustrated in FIG. 11F becomes necessary, instead of an OD value illustrated in FIG. 11E. Thus, when the image region is large as in FIG. 11F, it is necessary to set low a thinning ratio of the non-edge portion so that the macro density becomes the same degree as that in FIG. 11D.

By thus setting lower a thinning ratio of the non-edge portion of an image of large size than a thinning ratio of the non-edge portion of an image of small size, a reduction of image density (macro density) that may occur when an image size increases can be retarded. Therefore, by varying a thinning ratio of the non-edge portion according to the size of an image (character/line drawing in the present exemplary embodiment), a high-quality image having a sufficient density regardless of the size of the image can be obtained.

As described above, in order to obtain a high-quality thinned image, it is useful to make a thinning ratio of a color image smaller than a thinning ratio of a black image (condition 1) and to make a thinning ratio of the large image smaller than a thinning ratio of the small image (condition 2). In an attempt to study these conditions, it was found out that the condition 1 was more influential on image quality than the condition 2.

Hence, in the present exemplary embodiment, if a thinning ratio for the non-edge portion in a color image of large size with image size determined as equal to or greater than a threshold value is denoted as a first thinning ratio (X1), a thinning ratio for the non-edge portion in a color image of small size with image size determined as less than the threshold values is denoted as a second thinning ratio (X2), a thinning ratio for the non-edge portion in a black image of large size with image size determined as equal to or greater than the threshold value is denoted as a third thinning ratio (X3), and a thinning ratio for the non-edge portion in a black image of small size with image size determined as less than the threshold value is denoted as a fourth thinning ratio(X4), an appropriate thinning ratio is set according to color information and size information of the image, to satisfy a relationship of X1<X2<X3<X4. More specifically, as illustrated in FIG. 10, X1=25%, X2=40%, X3=50%, and X4=75% are set.

Now, the flowchart of FIG. 10, which is composed of FIGS. 10A and 10B, will be described. Steps S1101, S1102, and S1103 in FIG. 10 are the same as steps S101, S102, and S104 in FIG. 5, respectively, and thus descriptions of these steps will not be repeated.

In step S1103, if it is determined that processing target color is black (BLACK in step S1103), then the processing proceeds to S1104. In step S1104, the recording control unit 500 determines whether image attribute is character or line drawing. If it is determined as character (CHARACTER in step S1104), then the processing proceeds to step S1105. In step S1105, the recording control unit 500 determines whether the point number of character is less than 10 point (less than the threshold value) or equal to or greater than 10 point (equal to or greater than the threshold value). In step S1105, if it is determined that the point number is less than 10 point (<10 p in step S1105), then in step S1106, a thinning mask of 75% thinning ratio is selected as a mask for thinning the non-edge portion of character of less than 10 point. The thinning ratio is determined by such selection of the thinning mask.

Subsequently, in step S1107, the recording control unit 500 generates character non-edge portion thinned data of K (i) by thinning the non-edge portion of the character using the 75% thinning mask. On the other hand, in step S1105, if it is determined that the point number is 10 point or greater 10 p in step S1105), then in step S1116, the recording control unit 500 selects a thinning mask of 50% thinning ratio as a mask for thinning the non-edge portion of the character with 10 point or greater. Subsequently, in step S1117, the recording control unit 500 generates character non-edge portion thinned data of K (ii) by thinning the non-edge portion of the character using the 50% thinning mask.

Further, in step S1104, if it is determined that the attribute is line drawing (LINE DRAWING in step S1104), then the processing proceeds to step S1125. In step S1125, the recording control unit 500 determines whether the point number of line drawing is less than 4 point (less than the threshold value) or 4 point or greater (equal to or greater than the threshold value). In step S1125, if it is determined that the point number is less than 4 point (<4 p in step S1125), then in step S1126, the recording control unit 500 selects a thinning mask of 75% thinning ratio as a mask for thinning the non-edge portion of the line drawing with less than 4 point.

Subsequently, in step S1127, the recording control unit 500 generates line drawing non-edge portion thinned data of K (iii) by thinning the non-edge portion of the line drawing using the 75% thinning mask. On the other hand, in step S1125, if it is determined that the point number is 4 point or greater 4 p in step S1125), then in step S1136, the recording control unit 500 selects a thinning mask of 50% thinning ratio as a mask for thinning the non-edge portion of the line drawing with 4 point or greater. Subsequently, in step S1137, the recording control unit 500 generates line drawing non-edge portion thinned data of K (iv) using the 50% thinning mask by thinning the non-edge portion of the line drawing.

Further, in step S1103, if it is determined that processing target color is not black (OTHER THAN BLACK in step S1103), then the processing proceeds to S1154. In step S1154, the recording control unit 500 determines whether image attribute is character or line drawing. In step S1154, if it is determined that the image attribute is character (CHARACTER in step S1154), then the processing proceeds to step S1155. In step S1155, the recording control unit 500 determines whether the point number of the character is less than 10 point (threshold value) or 10 point or greater. In step S1155, if it is determined that the point number is less than 10 point (<10 p in step S1155), then in step S1156, the recording control unit 500 selects a thinning mask of 40% thinning ratio as a mask for thinning the non-edge portion of the character with less than 10 point. Subsequently, in step S1157, the recording control unit 500 generates character non-edge portion thinned data of color (CMY) (v) by thinning the non-edge portion of the character using the 40% thinning mask. On the other hand, in step S1155, if it is determined that the point number is 10 point or greater 10 p in step S1155), then in step S1166, the recording control unit 500 selects a thinning mask of 25% thinning ratio as a mask for thinning the non-edge portion of the character with 10 point or greater. Subsequently, in step S1167, the recording control unit 500 generates character non-edge portion thinned data of color (CMY) (vi) by thinning the non-edge portion of the character using the 25% thinning mask.

Further, in step S1154, if it is determined as line drawing (LINE DRAWING in step S1154), then the processing proceeds to step S1175. In step S1175, the recording control unit 500 determines whether the point number of the line drawing is less than 4 point (threshold value) or 4 point or greater. In step S1175, if it is determined that the point number is less than 4 point (<4p in step S1175), then in step S1176, the recording control unit 500 selects a thinning mask of 40% thinning ratio as a mask for thinning the non-edge portion of the line drawing with less than 4 point. Subsequently, in step S1177, the recording control unit 500 generates line drawing non-edge portion thinned data of color (CMY) (vii) by thinning the non-edge portion of the line drawing using the 75% thinning mask. On the other hand, in step S1175, if it is determined that the point number is 4 point or greater 4p in step S1175), then in step S1186, the recording control unit 500 selects a thinning mask of 25% thinning ratio as a mask for thinning the non-edge portion of the line drawing with 4 point or greater. Subsequently, in step S1187, the recording control unit 500 generates line drawing non-edge portion thinned data color (CMY) (viii) by thinning the non-edge portion of the line drawing using the 25% thinning mask.

Finally, in step S1109, the recording control unit 500 generates recording data by combining the thinned data (i) to (viii) generated in the above manner, with the non-attribute data and the character/line drawing edge portion data generated in step S1108.

According to the present exemplary embodiment described above, a thinning ratio of the non-edge portion is set variable according to processing target color and image size. Consequently, regardless of color and size of an image (character or line drawing in the present example), it becomes possible to form a high-quality image in which an edge portion is sharp and the density of the non-edge portion is sufficient. Further, an amount of recording material used for formation of the non-edge portion is reduced, and as a result, cost reduction effect can be obtained together.

In the above-described first exemplary embodiment, thinning processing is performed on non-edge portions regardless of processing target color. In contrast, in a fourth exemplary embodiment, when processing target color is K, similar to the first exemplary embodiment, the thinning processing is performed only on the non-edge portion, but when the processing target color is color (e.g., a color other than black), it is characterized in that the thinning processing is performed on not only the non-edge portions but also the edge portions. For this reason, determination processing in step S102 in FIG. 5 is changed to determining an edge portion of black or else (non-edge portion of black, edge portion of color, non-edge portion of color). Then, if it is determined as the edge portion of black (F in step S102), then the processing proceeds to step S103. If it is determined as other than the edge portion of black (YES in step S102), then the processing proceeds to step S104. Then, in step S104, if it is determined that processing target color is black (BLACK in step S104), then in step S105, a thinning mask for thinning the non-edge portion of black is selected. On the other hand, in step S104, if it is determined that processing target color is color (OTHER THAN BLACK in step S104), then in step S107, a thinning mask for thinning the non-edge portion and the edge portion of color is selected. In other respects, the present exemplary embodiment is similar to the first exemplary embodiment.

In the case of color character or color line drawing, which is often expressed in halftone, a dot recording duty ratio of the edge portion and a dot recording duty ratio of the non-edge portion may vary in some cases according to color. In this case, if only the non-edge portion is thinned, one my get impression in some cases that recording colors are different between the edge portion and the non-edge portion. In order to prevent this, in the case of color character or color line drawing, it is also effective to perform thinning processing without distinguishing between the edge portion and the non-edge portion.

In the above-described first to fourth exemplary embodiments, the inkjet recording apparatus is used as an image recording apparatus, and the image recording apparatus applicable to the embodiments is not limited to this. For example, an electrophotographic printer using toner as recording material may be also used.

Further, in the above-described first to fourth exemplary embodiments, as a method for reducing the amount of recording material (e.g., ink or toner) used for formation of the non-edges of an image, a method for reducing the number of pieces of binary recording data (thinning the recording data) that constitutes the non-edge portions of the image has been illustrated by an example. However, the embodiments are not limited to this method. For example, a method for reducing values (density values) of the multivalued data that constitutes the non-edge portions of the image may be adopted. The values of the multivalued data correspond approximately to usage amounts of the recording materials. Therefore, even if a reduction ratio for reducing the values of the multivalued data is set, the usage amount of the recording material can be reduced by an amount corresponding to the above-described reduction ratio.

More specifically, setting of a reduction ratio (thinning ratio) for reducing the number pieces of binary recording data or a reduction ratio for reducing values of the multivalued data corresponds to setting of a reduction ratio for reducing an usage amount of the recording material. Therefore, if a reduction ratio for reducing the amount of the recording material used for formation of the non-edge portions of an image is determined based on color information of the image, and reduction processing for reducing the amount of the recording material used for formation of the non-edge portions of the image is executed according to the determined reduction ratio, then the usage amount of the recording material used for formation of the non-edge portions can be optimized depending on ink color.

In addition, in the above-described first to fourth exemplary embodiments, although a series of processing of image data is shared by an inkjet recording apparatus, as an example of an image recording apparatus, and a host PC, as an example of a data supply apparatus, the embodiments are not limited to this configuration. For example, in the image recording apparatus, the entire processing illustrated in FIG. 4 and FIG. 9 may be executed. Alternatively, in the data supply apparatus, the entire processing illustrated in FIG. 4 and FIG. 9 may be executed. In short, in the image processing system that includes the image recording apparatus and the data supply apparatus, it is only necessary that the above-described processing of image data can be executed.

In the above-described exemplary embodiments, characteristic image processing according to the embodiments are (processing for determining a thinning ratio of data of non-edge portions of image based on color information of image) is executed in the image recording apparatus. Accordingly, the image recording apparatus can correspond to the image processing apparatus. On the other hand, in a case where characteristic image processing according to the embodiments is executed by a data supply apparatus, the data supply apparatus (host PC) can correspond to the image processing apparatus.

Further, the embodiments are also realized by executing the following processing. Software (program) that realizes the functions of the above-described exemplary embodiments is supplied to a system or apparatus via a network or various types of storage media, and a computer (or a CPU, a micro-processing unit (MPU), and/or the like) of the system or the apparatus reads out and executes the program. Each apparatus, including the image processing apparatus, may include or otherwise be connected to the central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs. In an example, a computer-readable medium may store a program that causes an image processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-272575 filed Nov. 30, 2009, which is hereby incorporated by reference herein in its entirety.

What is claimed is:

1. An image processing apparatus, comprising:
an acquisition unit configured to acquire color information concerning color of an object having an attribute to be recorded by applying recording materials to a recording medium;
a determination unit configured to determine, based on whether the color information acquired by the acquisition unit indicates black or a color other than black, a reducing ratio for reducing an amount of the recording materials to be applied to the recording medium corresponding to non-edge portions of the object, wherein the non-edge portions are within edge portions of the object; and
a reducing unit configured to reduce the amount according to the reducing ratio determined by the determination unit,
wherein, in the case where the color information indicates a color other than black, the reducing ratio determined by the determination unit is lower than the reducing ratio determined by the determination unit in the case where the color information indicates black, and
wherein, using the reducing ratio for black and the reducing ratio for the color other than black, the reducing unit reduces the amount of black recording materials used and the amount of color other than black recording materials used to less than an amount determined according to the acquired color information, and the reducing unit does not perform the reduction based on the acquired information to an object that does not have a first attribute.

2. The image processing apparatus according to claim 1, wherein the reducing unit reduces the amount by thinning data of the non-edge portion.

3. The image processing apparatus according to claim 2, wherein the reducing unit reduces the amount by using a thinning mask.

4. An image processing apparatus according to claim 1, wherein the first attribute is at least one of character and line drawing.

5. An image processing apparatus according to claim 1, wherein the amount of the recording materials is amount of ink.

6. An image processing apparatus according to claim 1, wherein in a case where the color information indicates black, black recording material is applied to the recording medium corresponding to the non-edge portions of the object.

7. An image processing apparatus according to claim 6, wherein in a case where the color information indicates a color other than black, a plurality of recording materials are applied to the recording medium corresponding to the non-edge portions of the object.

8. An image processing apparatus according to claim 1, wherein the reducing unit applies a determined reducing ratio to a first attribute of the object and does not apply the determined reducing ratio to a second attribute of the object that is different from the first attribute.

9. An image processing apparatus, comprising:
a discrimination unit configured to discriminate an attribute of an object;
an acquisition unit configured to acquire, if the attribute of the object discriminated by the discrimination unit is a first attribute, color information concerning color of the object having the first attribute, and not to acquire, if the attribute of the object discriminated by the discrimination unit is a second attribute that is different from the first attribute, color information concerning color of the object having the second attribute;
a determination unit configured to determine, based on whether the color information acquired by the acquisition unit indicates black or a color other than black, a reducing ratio for reducing an amount of recording materials to be applied to a recording medium corresponding to non-edge portions of the object having the first attribute, wherein a non-edge portion is within edge portions of the object; and
a reducing unit configured to reduce the amount according to the reducing ratio determined by the determination unit,
wherein, in the case where the color information of the object having the first attribute indicates a color other than black, the determination unit determines the reducing ratio to be lower than in the case where the color information of the object having the first attribute indicates black.

10. An image processing apparatus according to claim 9, wherein, in the case where the color information indicates black, the reducing ratio determined by the determination unit is less than one-hundred percent.

11. An image processing apparatus, comprising:
an acquisition unit configured to acquire color information concerning color of a character and size information concerning size of the character, to be recorded by applying recording materials to a recording medium;
a determination unit configured to determine, according to the color information and the size information acquired by the acquisition unit, a reducing ratio for reducing an amount of the recording materials to be applied to the recording medium corresponding to a non-edge portion of the character, wherein the non-edge portion is within an edge portion of an object; and
a reducing unit configured to reduce the amount according to the reducing ratio determined by the determination unit,
wherein, if the reducing ratio, determined in the case where the color information of the character indicates a color other than black and the size information of the character is equal to or greater than a threshold value, is denoted as X1, the reducing ratio, determined in the case where the color information of the character indicates a color other than black and the size information of the character is less than the threshold value, is denoted as X2, the reducing ratio, determined in the case where the color information of the character indicates black and the size information of the character is equal to or greater than the threshold value, is denoted as X3, and the reducing ratio, determined in the case where the color information of the character indicates black and the size information of the character is less than the threshold value, is denoted as X4, the determination unit determines the reducing ratio in such a manner as to satisfy a relationship of X1<X2<X3<X4.

12. An image processing apparatus, comprising:
a discrimination unit configured to discriminate attribute of an object;
an acquisition unit configured to acquire, if the attribute of the object discriminated by the discrimination unit is a first attribute, color information concerning color of the object having the first attribute and size information concerning size of the image having the first attribute, to be recorded by applying recording materials to a recording medium;
a determination unit configured to determine, according to the color information and size information acquired by the acquisition unit, a reducing ratio for reducing an amount of the recording materials to be applied to the recording medium corresponding to non-edge portions of the object having the first attribute, the non-edge portions being within edge portions of the object; and
a reducing unit configured to reduce the amount according to the reducing ratio determined by the determination unit,
wherein, if the reducing ratio, determined in the case where the color information of the object indicates a color other than black and the size information of the object is equal to or greater than a threshold value, is denoted as X1, the reducing ratio, determined in the case where the color information of the object indicates a color other than black and the size information of the object is less than the threshold value, is denoted as X2, the reducing ratio, determined in the case where the color information of the object indicates black and the size information of the object is equal to or greater than the threshold value, is denoted as X3, and the reducing ratio, determined in the case where the color information of the object indicates black and the size information of the image is less than the threshold value, is denoted as X4, the determination unit determines the reducing ratio in such a manner as to satisfy a relationship of X1<X2<X3<X4.

13. An image processing method, comprising:
acquiring color information concerning color of an object having an attribute to be recorded by applying recording materials to a recording medium;
determining, based on whether the acquired color information indicates black or a color other than black, a reducing ratio for reducing an amount of the recording materials to be applied to the recording medium corresponding to non-edge portions of the object, wherein the non-edge portions are within edge portions of the object; and
reducing the amount according to the determined reducing ratio,
wherein, in the case where the color information indicates a color other than black, the determined reducing ratio is lower than the reducing ratio determined in the case where the color information indicates black, and
wherein, using the reducing ratio for black and the reducing ratio for the color other than black, reducing includes reducing the amount of black recording materials used and the amount of color other than black recording materials used to less than an amount determined according to the acquired color information, and reducing includes not performing the reduction based on the acquired information to an object that does not have a first attribute.

14. An image processing method, comprising:
acquiring color information concerning color of a character and size information concerning size of the character, to be recorded by applying recording materials to a recording medium;
determining, according to the color information and the acquired size information, a reducing ratio for reducing an amount of the recording materials to be applied to the recording medium corresponding to a non-edge portion of the character, wherein the non-edge portion is within an edge portion of an object; and
reducing the amount according to the determined reducing ratio,
wherein, if the reducing ratio, determined in the case where the color information of the character indicates a color other than black and the size information of the character is equal to or greater than a threshold value, is denoted as X1, the reducing ratio, determined in the case where the color information of the character indicates a color other than black and the size information of the character is less than the threshold value, is denoted as X2, the reducing ratio, determined in the case where the color information of the character indicates black and the size information of the character is equal to or greater than the threshold value, is denoted as X3, and the reducing ratio, determined in the case where the color information of the character indicates black and the size information of the character is less than the threshold value, is denoted as X4, determining includes determining the reducing ratio in such a manner as to satisfy a relationship of X1<X2<X3<X4.

15. An image processing apparatus, comprising:
an acquisition unit configured to acquire color information concerning color of an object having an attribute to be recorded by applying recording materials to a recording medium;
a determination unit configured to determine, according to the color information acquired by the acquisition unit, a reduction ratio for reducing an amount of the recording materials to be applied to the recording medium corresponding to non-edge portions of the object, wherein the non-edge portions are within edge portions of the object; and
a reducing unit configured to reduce the amount according to the reduction ratio determined by the determination unit,
wherein, in the case where the color information indicates a first color, the reduction ratio determined by the determination unit is lower than the reduction ratio determined by the determination unit in the case where the color information indicates a second color having a brightness that is less than the first color, and
wherein, using the reduction ratio for the second color and the reduction ratio for the first color, the reducing unit reduces the amount of the second color recording materials used and the amount the first color recording materials used to less than an amount determined according to the acquired color information, and the reducing unit does not perform the reduction based on the acquired information to an object that does not have a first attribute.

16. A non-transitory computer-readable medium storing a program which, when executed, causes an image processing apparatus to perform an image processing method, wherein the image processing method comprises:
acquiring color information concerning color of an object having an attribute to be recorded by applying recording materials to a recording medium;
determining, based on whether the acquired color information indicates black or a color other than black, a reducing ratio for reducing an amount of the recording materials to be applied to the recording medium corresponding to non-edge portions of the object, wherein the non-edge portions are within edge portions of the object; and
reducing the amount according to the determined reducing ratio,
wherein, in the case where the color information indicates a color other than black, the determined reducing ratio is lower than the reducing ratio determined in the case where the color information indicates black, and
wherein, using the reducing ratio for black and the reducing ratio for the color other than black, reducing includes reducing the amount of black recording materials used and the amount of color other than black recording materials used to less than an amount determined according to the acquired color information, and reducing includes not performing the reduction based on the acquired information to an object that does not have a first attribute.

* * * * *